United States Patent
Watkins (10) Patent No.: US 10,644,763 B1
(45) Date of Patent: May 5, 2020

(54) TECHNIQUE FOR SINGLE ANTENNA FULL DUPLEX

(71) Applicant: KABUSHIKI KAISHA TOSHIBA, Minato-ku (JP)

(72) Inventor: Gavin Tomas Watkins, Bristol (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/360,555

(22) Filed: Mar. 21, 2019

(51) Int. Cl.
| | |
|---|---|
| *H04L 23/02* | (2006.01) |
| *H04B 7/0413* | (2017.01) |
| *H04B 1/00* | (2006.01) |
| *H04B 1/16* | (2006.01) |
| *H04L 5/14* | (2006.01) |

(52) U.S. Cl.
CPC ........ *H04B 7/0413* (2013.01); *H04B 1/0053* (2013.01); *H04B 1/1607* (2013.01); *H04L 5/14* (2013.01)

(58) Field of Classification Search
CPC ........ H04L 1/0054; H04L 1/005; H04L 5/14; H04L 25/0278; H04B 1/525; H04B 1/0458; H04B 1/56; H03B 2200/198; H03B 2200/192
USPC ....................................................... 375/262
See application file for complete search history.

(56) References Cited

U.S. PATENT DOCUMENTS

| | | | |
|---|---|---|---|
| 5,691,978 A | 11/1997 | Kenworthy | |
| 10,218,426 B1 * | 2/2019 | Sano | H04B 7/0682 |
| 2007/0247257 A1 | 10/2007 | Shastry et al. | |
| 2013/0241669 A1 * | 9/2013 | Mikhemar | H04B 1/52 333/126 |
| 2013/0241670 A1 * | 9/2013 | Mikhemar | H04B 1/52 333/126 |
| 2015/0341125 A1 | 11/2015 | Bharadia et al. | |
| 2016/0094331 A1 | 3/2016 | White et al. | |
| 2017/0093441 A1 * | 3/2017 | Mandegaran | H04B 1/005 |
| 2017/0338854 A1 * | 11/2017 | Perumana | H04B 1/56 |
| 2017/0358857 A1 | 12/2017 | Watkins | |

FOREIGN PATENT DOCUMENTS

| | | |
|---|---|---|
| CN | 205643694 U | 10/2016 |
| EP | 1 990 925 A2 | 11/2008 |
| EP | 2 639 964 A2 | 9/2013 |

(Continued)

OTHER PUBLICATIONS

Thomas Brauner, et al., "A Novel Carrier Suppression Method for RFID" IEEE Microwave and Wireless Components Letters, vol. 19, No. 3, Mar. 2009, pp. 128-130.

F. M. Ghannouchi, et al., "Load-Pull Techniques and their Applications in Power Amplifiers Design (Invited)" 2011 IEEE Bipolar/BiCMOS Circuits and Technology Meeting, 2011, pp. 133-137.

(Continued)

*Primary Examiner* — Khai Tran
(74) *Attorney, Agent, or Firm* — Oblon, McClelland, Maier & Neustadt, L.L.P.

(57) ABSTRACT

A full duplex system comprising a combiner with a first port connected to an antenna, a second port connectable to a source of a signal to be transmitted via the antenna, a third port for outputting a signal received via the antenna and a fourth port connected to a variable impedance. The variable impedance comprises a power splitter with an input connected to the fourth port and at least two outputs, wherein at least two outputs are connected to each other via variable phase shifting and attenuation circuitry.

15 Claims, 6 Drawing Sheets

(56) References Cited

FOREIGN PATENT DOCUMENTS

| EP | 2 903 170 A1 | 8/2015 |
|---|---|---|
| GB | 2 372 902 A | 9/2002 |
| WO | WO 2007/149957 A1 | 12/2007 |
| WO | WO 2014/065825 A1 | 5/2014 |
| WO | WO 2014/151055 A1 | 9/2014 |
| WO | WO 2016/023445 A1 | 2/2016 |

OTHER PUBLICATIONS

Meng Cai, et al., "A 15GHz Full Duplex System for Microwave Backhauling" 2015 IEEE 81st Vehicular Technology Conference (VTC Spring), 2015, pp. 1-5.

Michael E. Knox, "Single Antenna Full Duplex Communications using a Common Carrier" WAMICON 2012 IEEE Wireless & Microwave Technology Conference, 2012, 6 pages.

Dinesh Bharadia, et al., "Full Duplex Radios" ACM SigComm Conference, 2013, pp. 375-386.

M. J. Cryan et al., "Integrated Active Antenna with Simultaneous Transmit-Receive Operation" IEEE Antennas and Propagation Society International Symposium. 1996 Digest, 1996, pp. 1314-1317.

M. J. Cryan, et al., "An integrated Active Circulator Antenna" IEEE Microwave and Guided Wave Letters, vol. 7, No. 7, Jul. 1997, pp. 190-191.

Peng Bai, et al., "A Novel RX-TX Front-Ends for Passive RFID Reader with High Isolation" 2007 International Symposium on Microwave, Antenna, Propagation and EMC Technologies for Wireless Communications, 2007, pp. 332-335.

Leo Laughlin, et al., "A Widely Tunable Full Duplex Transceiver Combining Electrical Balance Isolation and Active Analog Cancellation" 2015 IEEE 81st Vehicular Technology Conference (VTC Spring), 2015, 5 pages and cover page.

V. G. Koll, et al., "Simultaneous Two-Way Data Transmission over a Two-Wire Circuit" IEEE Transactions on Communications, vol. 21, No. 2, Feb. 1973, pp. 143-147.

* cited by examiner

TECHNIQUE FOR SINGLE ANTENNA FULL DUPLEX

FIELD

Embodiments described herein relate generally to Full Duplex (FD) systems and, more generally, to tuneable wideband FD architectures.

BACKGROUND

Full Duplex (FD) is the simultaneous transmission and reception (STAR) of wireless signals on the same frequency at the same time and is still a relatively new technology. FD has been approved as an option for the 802.11ax WiFi standard, and is being investigated for mobile phone applications by a number of technology companies.

In the following, embodiments will be described with reference to the drawings in which.

DETAILED DESCRIPTION

According to an embodiment there is provided a full duplex system comprising a combiner with a first port connected to an antenna, a second port connectable to a source of a signal to be transmitted via the antenna, a third port for outputting a signal received via the antenna and a fourth port connected to a variable impedance. The variable impedance comprises a power splitter with an input connected to the fourth port and at least two outputs, wherein two of the at least two outputs are connected to each other via variable phase shifting and attenuation circuitry.

In an embodiment the variable phase shifting and attenuation circuitry comprises at least one of a variable attenuator or a variable phase shifter.

In an embodiment at least one of the variable attenuator and the variable phase shifter comprises series connected discrete switching elements.

In an embodiment the variable phase shifting and attenuation circuitry comprises a variable attenuator comprising a plurality of series connected attenuation circuits, wherein each attenuation circuit can be switched between a first state and a second state, wherein attenuation in the first state is different from attenuation in the second state.

The attenuation in the first state may be zero, while the attenuation in the second state may be non-zero.

The second states of respective attenuation circuits may provide different levels of attenuation or the same level of attenuation.

In an embodiment the variable phase shifting and attenuation circuitry comprises a variable phase shifter comprising a plurality of series connected phase shifting circuits, wherein each phase shifting circuit can be switched between a first state and a second state, wherein a phase shift introduced in the first state is different from a phase shift introduced in the second state.

The second states of respective phase shifting circuits may provide different amounts of phase shift or the same amounts of phase shift.

Individual phase shifting circuits may comprise two discrete transmission lines that can be switched between and that introduce different phase shifts or delays.

In an embodiment the variable phase shifting and attenuation circuitry comprises a quadrature splitter connected, via two signal paths, to a quadrature mixer, the two signal paths configured to be individually attenuatable.

In an embodiment the variable phase shifting and attenuation circuitry comprises an amplifier.

In an embodiment the power splitter is a Wilkinson type power splitter or a resistive power splitter.

In an embodiment the combiner is a Hybrid Coupler or a rat-race combiner.

An embodiment further comprises control circuitry connected to the variable phase shifting and attenuation circuitry.

The control circuitry may be configured to switch the variable attenuator between the first and second states so that a desired attenuation value is achieved through the series connection of the attenuation circuits.

The control circuitry may be configured to switch the variable attenuator between the first and second states so that a desired attenuation value is achieved through the series connection of the attenuation circuits.

The control circuit may be configured to vary the attenuation and phase delay such that the signals propagated along the loop between the outputs of the power splitter, re-combined in the power splitter, injected into the fourth port and propagated by the combiner to the third port in a manner that minimises self-interference.

According to an embodiment there is provided a full duplex system as described above. The system further comprises a controller configured to control the variable phase shifting and attenuation circuitry. The controller may be part of a digital base band that is responsible for modulating and demodulating the transmitted and received signals respectively. In an embodiment the controller runs an algorithm to adapt the attenuator and phase shifter to minimise the power of the transmitted signal in the receive path.

According to an embodiment there is provided a full duplex MIMO system comprising two or more of any of the above described full duplex systems. The power splitters of at least one of the two or more full duplex systems comprises an output connected, via further variable phase shifting and attenuation circuitry, to a corresponding output of a power splitter of another one of the two or more full duplex systems.

In an embodiment any of the above discussed systems is a mobile phone, a WiFi router, a mobile phone basestataion, a wireless power transfers system or a mmWave wireless backhaul.

Figure 1:
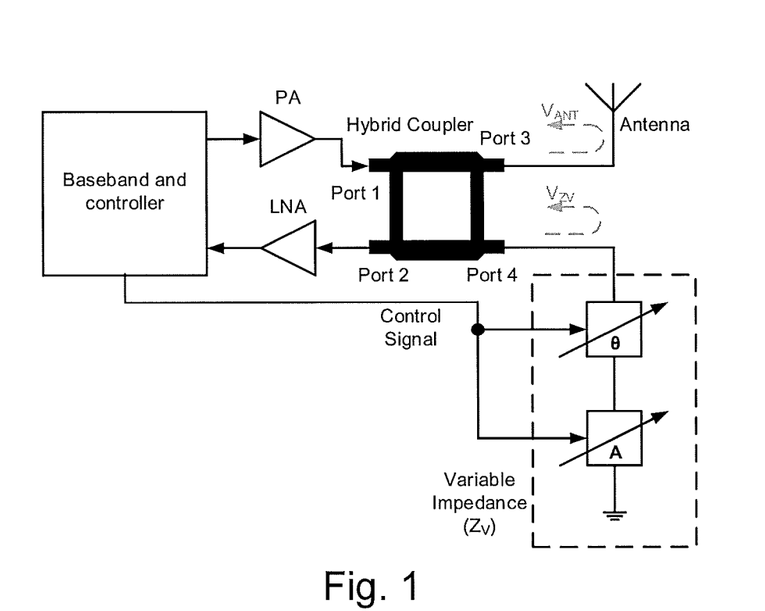
FIG. 1 shows a known FD system.

FIG. 1 shows a known STAR system comprising a baseband and controller that provides an output signal that is to be transmitted to a power amplifier (PA). The amplified signal is applied to an input port (Port 1) of a Hybrid Coupler. The Hybrid coupler outputs the amplified transmission signal to the Antenna via Port 3. Signal received by the antenna enters the Hybrid Coupler at Port 3 and is output to the low noise amplifier (LNA) and, from there, transmitted to the baseband and controller.

Antennas have a finite return-loss due to their mismatch, causing a portion of the transmit signal (VANT) to be reflected back into the combining network, as shown in FIG. 1. This reflected signal is transmitted to the LNA in the same manner as a signal received by the antenna to interfere with the received signal. This reflected signal therefore forms part of the self-interference of the system along with the inherent leakage of the combining network. The fourth port of Hybrid Couplers is often terminated with the characteristic impedance of the transmission lines used in the system. In FIG. 1, however, a variable resistance $Z_V$ is instead connected to port 4 of the Hybrid Coupler. $Z_V$'s function is to produce a correction signal ($V_{ZV}$) with the appropriate amplitude and phase to cancel the self-interference. In FIG. 1 $Z_V$ is composed of the series combination of a variable phase shifter, variable attenuator and short circuit. The signal output at Port 4 of the Hybrid Coupler is phase shifted and attenuated by a variable amount that can be set by the controller. The signal is reflected by the short circuit and propagates back to Port 4 of the Hybrid Coupler via the variable attenuator and phase shifter.

Figure 2:
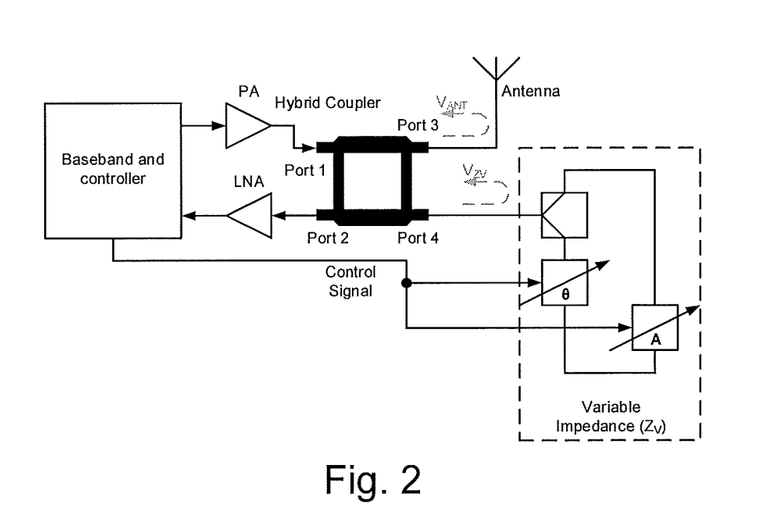
FIG. 2 shows a FD system of an embodiment.

An embodiment is shown in FIG. 2. The FD system of FIG. 2 differs from the system of FIG. 1 in that the variable impedance $Z_V$ uses a power splitter to create a system that avoids signal reflection. The input of the power splitter is connected to Port 4 of the hybrid coupler. The two output ports of the power splitter are connected to each other via a variable attenuator and a variable phase shifter. The split components of the signal propagate from the respective outputs of the power splitter to the opposite output via the variable attenuator and the variable phase shifter. After re-entering the power splitter the two signals re-combine and are presented to Port 4 of the Hybrid Coupler. In this manner reflection of power within $Z_V$ is avoided.

The challenge with any FD systems where a high RF self-interference cancellation (SiC) is required, is to be able to cancel $V_{ANT}$ to a sufficiently large degree at the LNA input. Assuming a perfect hybrid coupler $V_{ZV}$ desirably has the same magnitude as $V_{ANT}$ but is in anti-phase. The magnitude and phase errors between $V_{ANT}$ and $V_Z$ should be minimised. This requires a high resolution of the phase shifter and the attenuator as well as the controller. Similarly, $V_{ZV}$ should be tuneable over the range of magnitude and phases likely to be produced by $V_{ANT}$, given the operating conditions and frequency of the system.

It was realised that the architecture of FIG. 1 is limited by the insertion loss of the various elements and the mismatch from their ports. These two factors limit the range over which $V_{ZV}$ can be tuned. The embodiment shown in FIG. 2 minimise insertion loss and reflection by adopting the loop connecting the two output ports of the power splitter. This ensures that $V_{ZV}$ only passes through the variable attenuator (A) and variable phase shifter (θ) once, so that the attenuation and phase shift resolution respectively provided by the variable attenuator and the variable phase shifter are maintained instead of being halved by a second passage of a reflected signal through the attenuator/phase shifter as is the case in the arrangement shown in FIG. 1. As the splitter used in the embodiment of FIG. 2 is a passive device, the mismatch at its ports will be minimal, overcoming the mismatch issue associated with the arrangement shown in FIG. 1. In embodiments that use passive components, such as in the embodiment shown in FIG. 2, the signal can pass through the loop connecting the outputs of the power splitter in both directions. This overcomes the inherent 3 dB loss provided by the power splitter.

Figure 3:
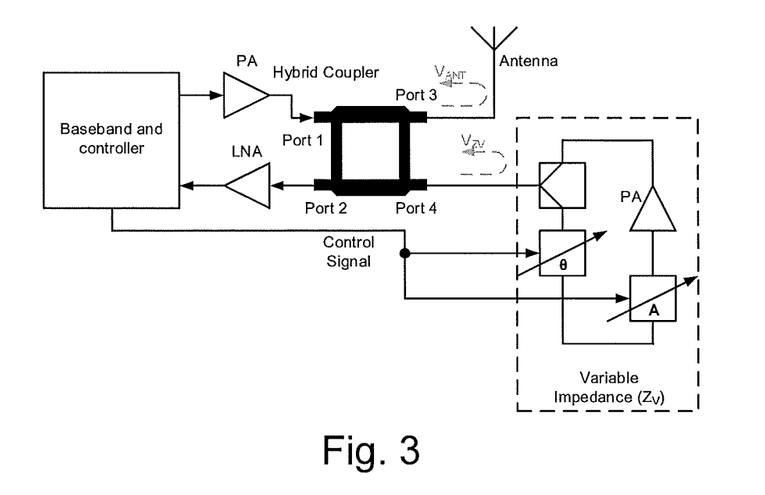
FIG. 3 shows a FD system of another embodiment.

FIG. 3 shows a further embodiment in which an amplifier is included in the loop connecting the two output ports of the power splitter. This overcomes residual insertion loss and mismatch present in the FIG. 2 embodiment.

Figure 4:
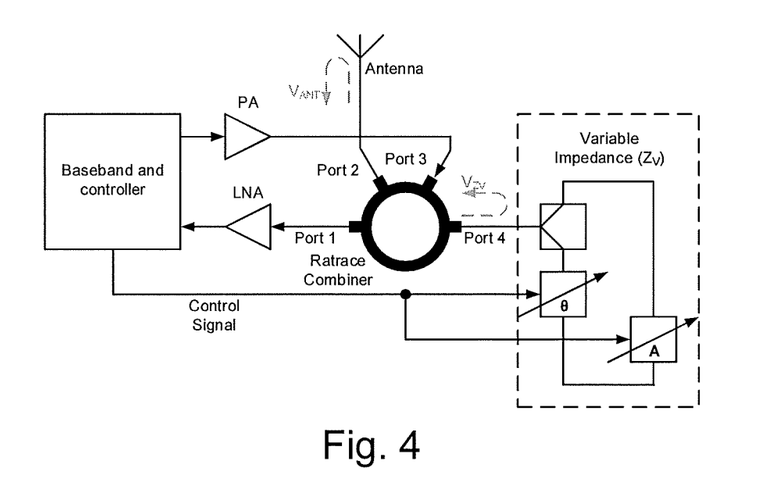
FIG. 4 shows a FD system of another embodiment.

FIG. 4 shows an alternative embodiment in which the Hybrid Coupler used in the FIG. 2 embodiment is replaced with a rat-race combiner.

Figure 5:
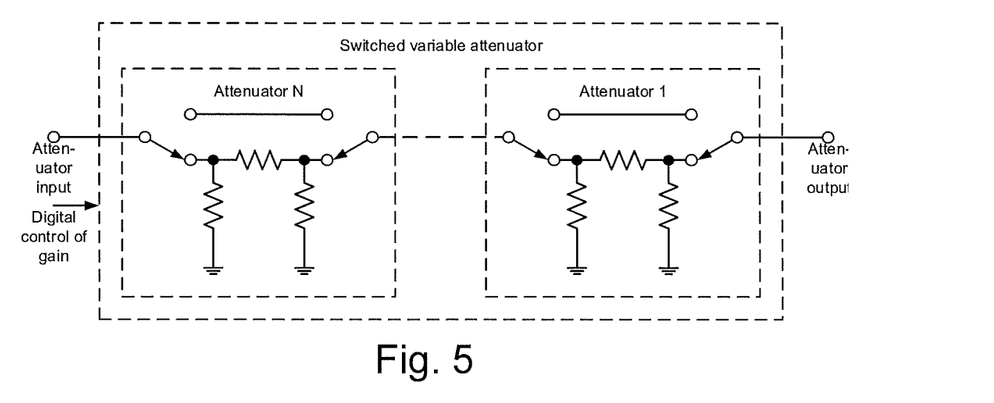
FIG. 5 shows a switchable attenuator of an embodiment.
Figure 6:
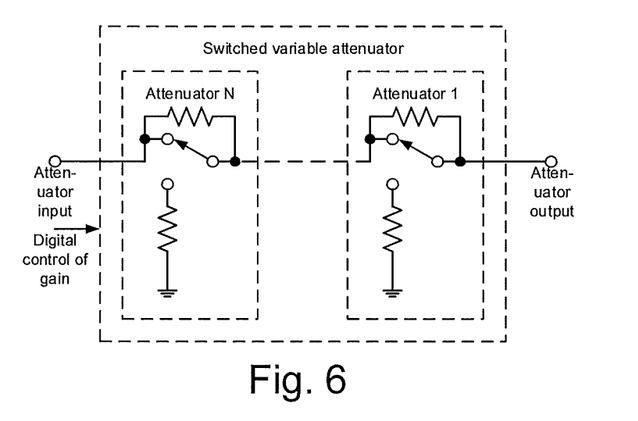
FIG. 6 shows a switchable attenuator of another embodiment.
Figure 7:
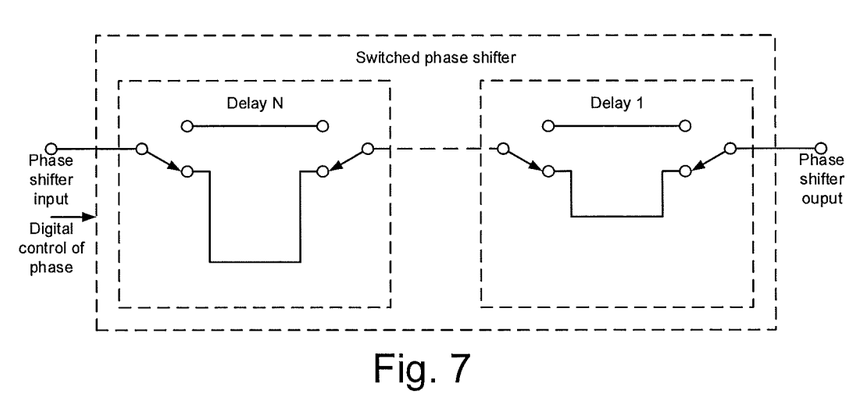
FIG. 7 shows a switchable delay arrangement of an embodiment.

The attenuator A and phase shifter θ shown in FIGS. 2 to 4 can be implemented in a number of ways, some examples of which are shown in FIGS. 5 to 7. FIG. 5 shows a variable attenuator in which one, two or more series connected resistive π-networks. Each of the networks is respectively connected to the preceding/successive network or the input/output of the variable attenuator by input and output switches. Both switches connected on a resistive π-network are operated in tandem so that the input and output of the resistive π-network are either connected to the resistive π-network or to a bypass of that network, shown above the network in FIG. 5. All of the switches are digitally controlled by the controller shown in FIGS. 2 to 4 so that a desired overall resistance can be generated by series connecting desired π-networks.

FIG. 6 shows an alternative series combination of resistive networks. In this alternative network the resistor extending in the horizontal direction is permanently connected between the input and output of the resistive networks but can be short circuited by a switch controlled by the controller. When the switch does not short circuit the resistor it connects to the second resistor in the network to create a voltage divider. The output voltage of the network is determined by the ratio of the two resistor values.

FIG. 7 shows a switched phase shifter comprising a plurality of series connected delay elements, Delay 1 to Delay N. In the embodiment all of the delay elements comprise a conductor of the same length (shown as the upper conductor in the delay elements shown in FIG. 7) and a conductor with a length that varies between delay elements (shown as the lower conductor in the delay elements shown in FIG. 7). Each delay element also comprises two switching elements that are controllable by the controller and that simultaneously switch to either connect the upper or lower conductor of the respective delay element between the input and output of the delay element. In this manner the overall delay of the switched phase shifter can be chosen such that a desired delay is achieved by the series connection of delay elements. In another embodiment the length of the lower conductor of the delay elements does not differ between the various delay elements or is the same for at least some delay elements. In this embodiment the overall delay can still be chosen, albeit with reduced resolution, by connecting various delay elements in series.

Figure 8:
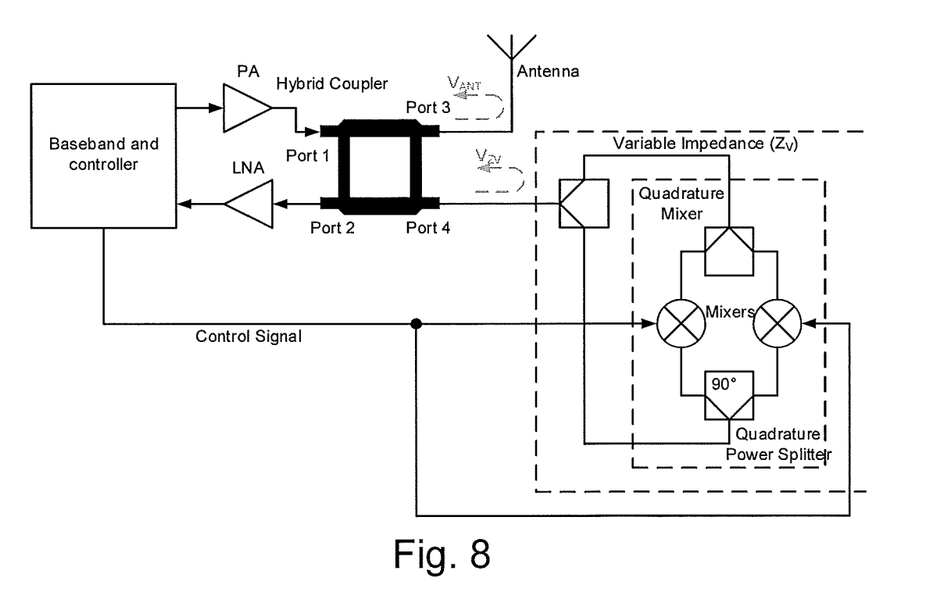
FIG. 8 shows a FD system of another embodiment.

In an alternative embodiment the variable attenuator and delay elements shown in FIGS. 3 and 4 are replaced by the quadrature mixer shown in FIG. 8. The signals emanating from Port 4 of the Hybrid Coupler are again input into a power splitter. The signals generated at the first output of the power splitter are applied to a quadrature power splitter, generating two signals that are 90 degrees out of phase. These two signals are individually multiplied with control signals provided by the controller shown in FIG. 8 before being recombined in a quadrature mixer. The combined signal is fed back as $V_{ZV}$ into port 4 of the Hybrid Combiner. In an embodiment passive mixers/splitter are used so that signals can propagate in both directions around the loop connecting the outputs of the power splitter that is directly connected to the port of the Hybrid Coupler. In other embodiments the signals can only propagate in one direction around the loop connecting the output ports of the power splitter. This may, for example, be the case where active mixers are used. In such arrangements the inclusion of an amplifier can overcome the insertion loss drawback caused by the power splitter.

Figure 9:
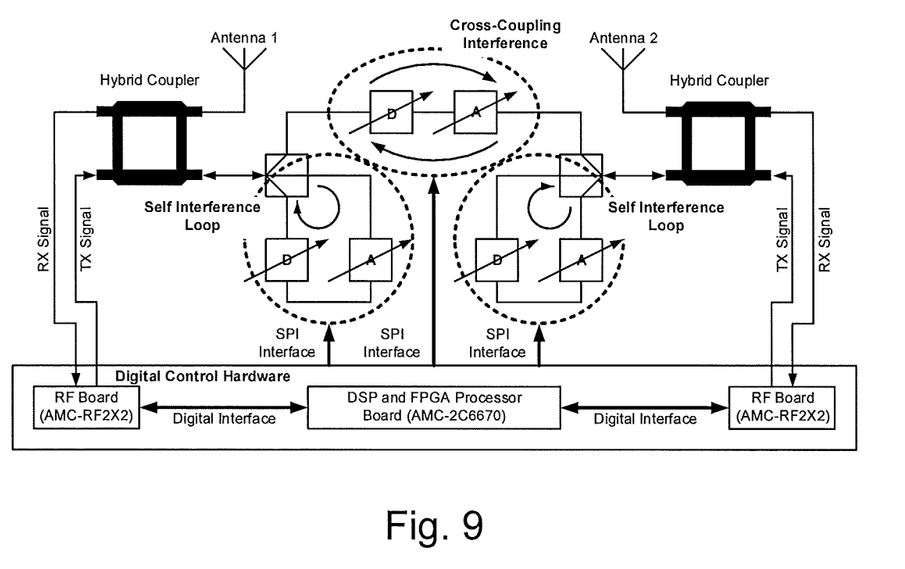
FIG. 9 shows a FD system of another embodiment.

The injection loop can be extended for MIMO use as shown in FIG. 9. The two antennae, Antenna 1 and Antenna 2, are part of a transmission or reception side of the MIMIO system. It will be appreciated that such an antenna system does not only suffer from interference between the transmit and receive channels of the individual antennae but that the transmit and receive channels of on antenna also interfere with those of the other antenna. Such interference can manifest itself in signals transmitted by one FD system propagating to the receive channel of the other, coupled FD system. The embodiment of FIG. 9 incorporates the FIG. 3 architecture for each of the two FD systems, albeit using a three way power splitter as part of $Z_V$ instead of the two way power splitter shown in FIG. 3. Two of the outputs of these three way power splitter are, again, connected to form a loop with a variable attenuator and phase shifter to allow cancellation of self-interference with in the FD system in the manner discussed above with reference to FIG. 3. The third output of the power splitter of one FD system is connected to the third output of the power splitter of the other FD system via a variable attenuator and a variable phase shifter. In this manner a signal transmitted by one FD system is applied, modified by the connecting variable attenuator and phase shifter and through the hybrid coupler of the other FD system to the receive channel of the other FD system.

Cross coupling between MIMO transmitters is well known and methods for quantifying its magnitude and phase are well known in the art and need not be discussed in detail herein. The digital control hardware is configured to, based on knowledge of cross coupling coefficients between the two FD systems, adjust the variable attenuator and the variable phase shifter connecting the two FD systems so that the transmit signal coupled from one FD system into the receiver chain of the other FD system is, as accurately as possible, equal to but opposite in phase to the transmit signal cross-coupled from the transmitting FD system to the other FD system via the antennae.

It will be appreciated that the FD systems do not need to use the Hybrid Couplers shown in FIG. 2 and can instead use rat-race combiners as shown in FIG. 4. In another embodiment one FD system may use a Hybrid Coupler while the other FD system uses a rat-race combiner. It will moreover be appreciated that the FD systems do not need to use the $Z_V$ architecture shown in FIG. 2 and can instead use a quadrature mixer architecture as shown in FIG. 8. Again, not all attenuation and phase shifting arrangements need to use the same architecture and one FD system and/or the crosscoupling arrangement between the FD systems may use a variable attenuator/phase shifter arrangement such as that shown in FIGS. 3 and 7 whilst other use a quadrature mixer arrangement as shown in FIG. 8.

It will moreover be appreciated that the MIMO system is not limited to comprising two FD systems only. In other embodiments more than two FD systems may be used, with cross-coupling compensation, such as that shown in FIG. 9, being applied between all FD systems that experience crosscoupling that is detrimental to the performance of the system.

It was realised that a core issue with any FD architecture is that it needs to be tuneable to maximise the SiC for a given environment and operating frequency. Architectures based on hybrid combiners, as shown in FIG. 1, can be tuned by terminating their fourth port with $Z_V$. This injects a signal ($V_{Z\_V}$) back into the combining network to cancel the self-interference signal. An input signal applied to $Z_V$ travels down one path of the input splitter, through the variable attenuator (A) and variable phase shifter (θ) before being entering the other port of the power splitter. This is $V_{ZV}$ and is a processed version of the transmitted signal generated by the PA. It should be noted, that in FIG. 2, where the path is purely passive, a signal applied to the splitter, will be equally split and pass through A and A in both directions. The two halves then combine in the splitter with the same gain and phase response. This effectively cancels out the insertion loss of the splitter if a Wilkinson type is used.

Figure 10:
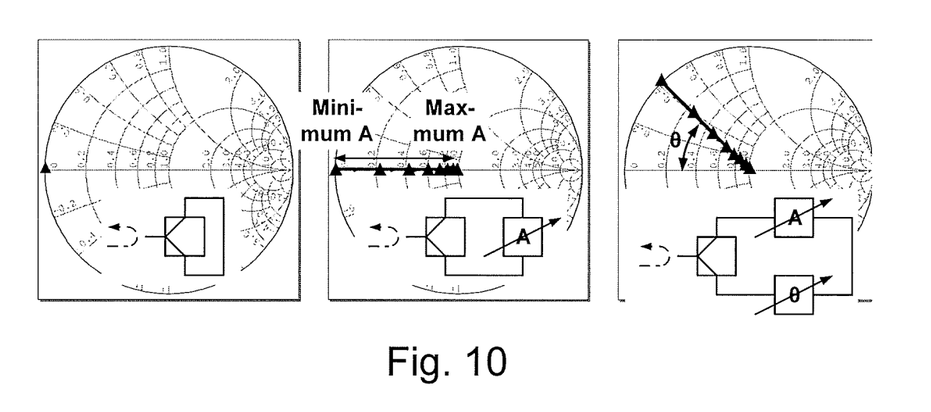
FIG. 10 shows Smith Charts illustrating the effects of tuneable attenuators and delay components on the tenability of embodiments.

As shown in FIG. 10, with A set to maximum, $V_{ZV}$ will be very small and $Z_V$ will be very close to the nominal system impedance (typically 50Ω). As A is reduced, the magnitude of $V_{ZV}$ grows. At minimum A $V_{ZV}$ will be quite large and X dB smaller than the signal presented to the power splitter, where X is the combined insertion loss of A and θ. In theory this is zero, but practically there will be some insertion loss. If the splitter is a resistive type, then this will be –6 dB. A allows the phase of $V_{ZV}$ to be manipulated so that it is can be in-phase with the input signal (an impedance >50Ω), in anti-phase to the input signal (an impedance <50Ω) or any impedance and phase between those limits. These insertion losses limit the region over which $V_{ZV}$ can be tuned, but can be overcome by including a PA in the network as shown in FIG. 3.

A variation on FIG. 2 is shown in FIG. 4 where the hybrid coupler is exchanged for a rat-race combiner. The circuit functions in exactly the same matter as of FIG. 2. Other variations are possible based on six port structures. A PA can be included in this circuit similar to that shown in FIG. 3 to overcome the loss. Further variations include substituting the power splitter in FIG. 2 with a circulator and replacing the PA and A in FIG. 3 with a variable gain amplifier.

A and θ can be implemented in various ways using either linear or switched techniques. Linear techniques involve variable elements like varactor diodes or PIN diodes. Embodiments propose to use switched techniques like those shown in FIGS. 5 to 7, which are compatible with modern digital control systems. An alternative architecture is also shown in FIG. 8 where A and θ are replaced with a quadrature mixer to allow linear control.

The invention disclosed in FIG. 2 can be incorporated into a Multiple Input Multiple Output (MIMO) arrangement as shown in FIG. 9 where the 2-way power splitter in the injection loop is replaced with a 3-way one so a portion of the signal can be tapped off and fed to a second antenna to cancel the Cross-Coupled Interference. This 3-way splitter can be of an equal ratio type, or with different ratios depending on the application. FIG. 9 is for a two antennas case, but more antennas can be used as required. Any of the variations of FIG. 2 shown in FIG. 3, FIG. 4 or FIG. 8 can be used in FIG. 9.

Some known FD systems include transformers and need a balanced input low noise amplifiers (LNA). Transformer realisation becomes hard at microwave frequencies due to the small physical dimensions and stray parasitic components. Balanced LNAs can be realised in silicon for communications applications, but harder in the discrete form needed for radar or back-haul purposes. Embodiments described herein can be integrated into silicon, but it could also be realised with coaxial components.

In present embodiments a cancellation system is used to suppress any self-interference presented to the input of the LNA. This is done by generating a cancellation signal which is the inverse of the self-interfering transmitted signal. Embodiments enable $V_{Z_V}$ to be tuned over a large part range. This is shown in FIG. 10, where A is shown to control the magnitude of $Z_V$ and A its phase. The insertion loss of $Z_V$ will reduce its tuneable range, and hence the degree of antenna mismatch that can be tolerated. To compensate for this, an additional amplifier can be incorporated as shown in FIG. 3.

Figure 11:
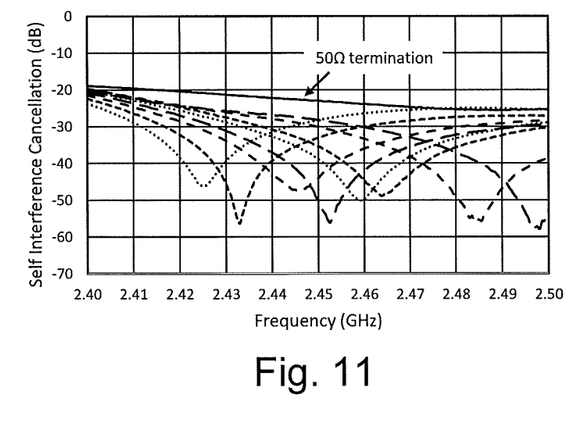
FIG. 11 shows Self Interference Cancellation achieved by an embodiment.

Using the configurations disclosed in FIG. 2, FIG. 5 and FIG. 7, a practical prototype was constructed optimised for the 2.45 GHz ISM band. It is shown in FIG. 11 that a SiC of −45 to −60 dB can be achieved over the band. Also included in FIG. 11 is the SiC achieved when $Z_V$ is replaced with a 50Ω termination. An improvement of >25 dB is possible by tuning $Z_V$. Architectures disclosed herein offer a greater tuning range than those presented elsewhere. Embodiments also have the ability to be easily incorporated into a MIMO system.

The operation of an injection loop of FIG. 2 is shown in FIG. 10, where A and A are shown to control the magnitude and phase of $Z_V$ respectively. FIG. 10 depicts signal reflection at the input of the power splitter.

Some results are shown for an FD injection loop in FIG. 11 based on the architecture of FIG. 2 incorporating FIG. 5 and FIG. 7. This figure also includes the case for when $Z_V$ is replaced with a 50Ω load, showing that by tuning $Z_V$ an additional 25-30 dB SiC is possible. Measurements were taken were in the 2.45 GHz Industrial, Medical and Scientific (ISM) band. However, embodiments are scalable to higher frequencies and output powers to meet the other applications mentioned above.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A full duplex system comprising:
   a baseband circuitry configured to modulate a transmission signal, and to demodulate a reception signal, wherein the transmission signal is to be transmitted via an antenna, and the reception signal is to be received via the antenna, and the transmission signal and the reception signal are subject to a full duplex scheme;
   a combiner including a first port electrically coupled to the antenna, a second port configured to receive, from the baseband circuitry, the transmission signal to be transmitted via both the first port and the antenna, a third port configured to transmit, to the baseband circuitry, a reception signal received via both the first port and the antenna, and a fourth port electrically coupled to a variable impedance;
   wherein the variable impedance comprises a loop structure via a power splitter, and variable phase shifting and attenuation circuitry, wherein a signal output from the fourth port is split by the power splitter, signals propagated along the loop structure between the outputs of the power splitter are re-combined in the power splitter, and the signal re-combined by the power splitter is input to the fourth port.

2. The full duplex system of claim 1, wherein the variable phase shifting and attenuation circuitry comprises at least one of a variable attenuator or a variable phase shifter.

3. The full duplex system of claim 2, wherein at least one of the variable attenuator and the variable phase shifter comprises series connected discrete switching elements.

4. The full duplex system of claim 1, wherein the variable phase shifting and attenuation circuitry comprises a variable attenuator comprising a plurality of series connected attenuation circuits, wherein each attenuation circuit can be switched between a first state and a second state, wherein attenuation in the first state is different from attenuation in the second state.

5. The full duplex system of claim 1, wherein the variable phase shifting and attenuation circuitry comprises a variable phase shifter comprising a plurality of series connected phase shifting circuits, wherein each phase shifting circuit can be switched between a first state and a second state, wherein a phase shift introduced in the first state is different from a phase shift introduced in the second state.

6. The full duplex system of claim 1, wherein the variable phase shifting and attenuation circuitry comprises a quadrature splitter connected, via two signal paths, to a quadrature mixer, the two signal paths configured to be individually attenuatable.

7. The full duplex system of claim 1, wherein the variable phase shifting and attenuation circuitry comprises an amplifier.

8. The full duplex system of claim 1, wherein the power splitter is a Wilkinson type power splitter or a resistive power splitter.

9. The full duplex system of claim 1, wherein the combiner is a Hybrid Coupler or a rat-race combiner.

10. The full duplex system of claim 1, further comprising control circuitry coupled to the variable phase shifting and attenuation circuitry.

11. The full duplex system of claim 1, further comprising a controller configured to control the variable phase shifting and attenuation circuitry.

12. A full duplex MIMO system comprising two or more full duplex systems as claimed in claim 1, wherein the power splitters of at least one of the two or more full duplex systems comprises an output coupled, via further variable phase shifting and attenuation circuitry, to a corresponding output of a power splitter of another one of the two or more full duplex systems.

13. The full duplex system of claim 1, wherein the system is a mobile phone, a WiFi router, a mobile phone base station, a wireless power transfers system or a mmWave wireless backhaul.

14. A full duplex system comprising:
   a baseband circuitry configured to modulate a transmission signal, and to demodulate a reception signal, wherein the transmission signal is to be transmitted via an antenna, and the reception signal is to be received via the antenna, and the transmission signal and the reception signal are subject to a full duplex scheme;
   a combiner including a first port electrically coupled to the antenna, a second port configured to receive, from the baseband circuitry, the transmission signal to be transmitted via both the first port and the antenna, a third port configured to transmit, to the baseband circuitry, the reception signal received via both the first port and the antenna, and a fourth port; and variable impedance circuitry comprising a loop structure via a power splitter, a variable phase shifter, and a variable attenuator, the power splitter including an input electrically coupled to the fourth port and at least two outputs, two of at least two outputs electrically coupled to the variable phase shifter and the variable attenuator, respectively, the variable phase shifter and the variable attenuator being coupled to each other.

15. A full duplex system comprising:

a baseband circuitry configured to modulate a transmission signal, and to demodulate a reception signal, wherein the transmission signal is to be transmitted via an antenna, and the reception signal is to be received via the antenna, and the transmission signal and the reception signal are subject to a full duplex scheme a combiner including a first port electrically coupled to the antenna, a second port configured to receive, from the baseband circuitry, the transmission signal to be transmitted via both the first port and the antenna, a third port configured to transmit, to the baseband circuitry, the reception signal received via both the first port and the antenna, and a fourth port; and variable impedance circuitry comprising a loop structure via a power splitter, a quadrature power splitter configured to generate two signals that are 90 degrees out of phase, and a quadrature mixer, the power splitter including an input electrically coupled to the fourth port and at least two outputs, one of at least two outputs coupled to an input of the quadrature power splitter, another of the at least two outputs electrically coupled to an output of the quadrature mixer, the two output signals being individually multiplied with control signals, the multiplied two output signals being input to the quadrature mixer.

* * * * *